United States Patent
Meyer et al.

(10) Patent No.: US 9,238,472 B2
(45) Date of Patent: Jan. 19, 2016

(54) WHEELSET AXLE PROTECTION

(75) Inventors: Heiko Meyer, Creussen (DE); Hans Juergen Maerkl, Stadtbergen (DE); Guntram Ruef, Graz (AT); Ralph Schmidt, Ahrensfelde (DE); Robert Thiess, Unterschleissheim (DE); Jens Vollert, Olching (DE)

(73) Assignee: Siemens Aktiengesellschaft, Munich (DE)

( * ) Notice: Subject to any disclaimer, the term of this patent is extended or adjusted under 35 U.S.C. 154(b) by 545 days.

(21) Appl. No.: 13/580,438

(22) PCT Filed: Feb. 17, 2011

(86) PCT No.: PCT/EP2011/052335
§ 371 (c)(1),
(2), (4) Date: Aug. 22, 2012

(87) PCT Pub. No.: WO2011/101401
PCT Pub. Date: Aug. 25, 2011

(65) Prior Publication Data
US 2012/0319420 A1    Dec. 20, 2012

(30) Foreign Application Priority Data
Feb. 22, 2010    (DE) .......................... 10 2010 009 437

(51) Int. Cl.
*B61F 19/00* (2006.01)
*B61F 19/02* (2006.01)
*B60B 17/00* (2006.01)
*B60B 37/06* (2006.01)

(52) U.S. Cl.
CPC ............. *B61F 19/02* (2013.01); *B60B 17/0034* (2013.01); *B60B 37/06* (2013.01)

(58) Field of Classification Search
CPC ...... B60B 17/0034; B60B 37/06; B61F 19/02
USPC ................................................ 295/7, 36.1, 37
See application file for complete search history.

(56) References Cited

U.S. PATENT DOCUMENTS

| | | | | |
|---|---|---|---|---|
| 2,747,918 | A * | 5/1956 | Blackwood | 295/36.1 |
| 4,158,407 | A * | 6/1979 | Rest | 206/318 |
| 6,511,380 | B1 | 1/2003 | Oetiker | |
| 6,568,333 | B1 * | 5/2003 | Kontio et al. | 105/218.1 |

FOREIGN PATENT DOCUMENTS

| | | | |
|---|---|---|---|
| CN | 1321228 A | 11/2001 | |
| CN | 1820941 A | 8/2006 | |
| CN | 101214821 A | 7/2008 | |
| DE | 3434603 A1 | 3/1986 | |
| EP | 1508455 A1 | 2/2005 | |
| EP | 1690701 A1 * | 8/2006 | .............. B60B 37/06 |
| EP | 1942040 A1 | 7/2008 | |
| FR | 358 019 | 1/1906 | |
| FR | 554 005 | 6/1923 | |

(Continued)

*Primary Examiner* — S. Joseph Morano
*Assistant Examiner* — Jean Charleston
(74) *Attorney, Agent, or Firm* — Laurence Greenberg; Werner Stemer; Ralph Locher

(57) ABSTRACT

The wheel set shaft of a rail vehicle is protected in an effective and economical manner by a protection device. The device includes an elastomeric mat which can be easily placed on the wheel set shaft and retaining means for retaining the elastomeric mat on the wheel set shaft.

9 Claims, 3 Drawing Sheets

(56) References Cited

FOREIGN PATENT DOCUMENTS

| FR | 2911102 A1 * | 7/2008 | ............ B60B 37/06 |
| FR | 2911102 A1 * | 11/2008 | ............ B61F 5/50 |
| GB | 191318287 | 6/1914 | |

* cited by examiner

WHEELSET AXLE PROTECTION

BACKGROUND OF THE INVENTION

Field of the Invention

The invention relates to a device for protecting a wheelset axle of a rail vehicle.

The invention further relates to a bogie and to a rail vehicle with such a device.

Rail vehicles generally comprise a car body and a plurality of bogies, which support the car body. The bogies generally have a plurality of wheelsets, each of which in each case comprises two rail wheels and one axle connecting the wheels together. While the rail vehicle is traveling, in particular, the wheelset axles are exposed to collisions with bodies such as ballast, ice, branches or animals. This causes damage to the wheelset axle and in particular to its paintwork or coating, so resulting in corrosion of the axle material and in cracking. The wheelset axle has therefore as a rule to undergo time-consuming and expensive repair operations.

Up to now, the wheelset axles have undergone time-consuming coating to protect them against damage from colliding bodies. The prior art also discloses baffle plates, which are attached to the traction motor, to the bogie frame and to the bogie gearbox. The devices known from the prior art are inadequate, however, when it comes to ensuring effective protection of the wheelset axle from collision-related damage.

BRIEF SUMMARY OF THE INVENTION

It is therefore an object of the invention to provide a device of the above-mentioned type which provides effective and inexpensive protection of the wheelset axle.

This object is achieved by the invention with a device for protecting a wheelset axle of a rail vehicle which comprises an elastomeric mat which may be applied to the wheelset axle and retaining means designed to retain the elastomeric mat on the wheelset axle.

This invention is additionally achieved by the invention with a rail vehicle comprising a wheelset axle provided with such a device.

The invention furthermore achieves the object with a bogie comprising a wheelset axle equipped with such a device.

According to the invention, a device is provided with an elastomeric mat, which can be fastened simply and therefore inexpensively to a wheelset axle using the connecting means. The kinetic energy of a colliding body, which has to be absorbed in the event of a collision by the wheelset axle through the device according to the invention, is resiliently attenuated by the elastomeric mat and thus distributed over a larger surface area. This prevents disadvantageous damage to the wheelset axle, such that the service life and in particular the costs of maintaining the wheelset axle are reduced. At the same time, the dimensions, i.e. length, width and thickness, of the elastomeric mat may be adapted to the wheelset geometry. By means of the invention, direct contact between colliding body and wheelset axle is thus prevented.

The device according to the invention is simple to mount on the wheelset axle, without significant amounts of labor. Demounting of the device may also be performed in minimal time.

Advantageously, the device comprises a housing of a rigid material, which encloses the elastomeric mat at least in part. The housing advantageously encloses the elastomeric mat completely. The housing increases protection of the wheelset axle still further, the kinetic energy of the colliding body thus firstly being absorbed by the deformation-resistant housing and only then being introduced into the elastomeric mat and attenuated thereby, such that the risk of damage to the elastomeric mat is reduced.

The elastomeric mat consists for example of an appropriate elastomeric material. For the purposes of the invention the elastomeric material may in principle be as desired. It should however be sufficiently resilient for the elastomeric mat, even if it is relatively thick, to be able to be laid about the wheelset axle simply and without the expenditure of excessive force. Furthermore, the material should be sufficiently strong for hasty damage to be prevented.

The elastomeric mat and/or the housing are advantageously constructed such that, after the device has been mounted on the wheelset axle, the latter is completely enclosed. In this way, the wheelset axle is fully protected.

According to one configuration of the invention, the housing and/or the elastomeric mat consist of separate parts. In one preferred configuration of the invention, the housing consists of one or two parts, the elastomeric mat being of one-piece construction. The configuration of the device overall or of parts of the device in the form of separate components simplifies mounting.

The housing appropriately comprises at least one overlap deflection for forming an extensive housing overlap. According to this configuration of the invention, a deflection which is S-shaped in side view is formed at the free peripheral sides of the housing facing each other when mounted, such that at least one free peripheral edge projects in the manner of a roof over a free peripheral edge facing it. This avoids a space between the housing portions and the wheelset axle.

The housing appropriately consists of sheet metal. Other rigid materials are for example plastics, in particular fiber-reinforced plastics or the like. The sheet metal material is preferably a stainless steel.

According to a preferred variant of the invention, the housing comprises incisions at both of its mutually facing free ends, which when mounted each face a wheel. As a result of the incisions, the sheet metal tongues defined by the incisions can be easily bent, such that the housing may be simply adapted to the geometry of the wheelset axle.

Hose clips or clamping fasteners are advantageous as the retaining means. These are cheap to obtain and allow rapid attachment of the device to the wheelset axle. In this case, the retaining means fully encircle the elastomeric mat and optionally the housing.

The variant of the device according to the invention that comprises a housing may be rapidly and simply mounted and demounted. The housing can likewise be tested quickly and without major effort. A test may thus be performed for example by an inspection of the housing. The axle and the housing may, moreover, be investigated by more complex visual testing. Ultrasound testing of the wheelset axle with device mounted thereon is also possible for the purposes of the invention. The device according to the invention is inexpensive to produce and simple to attach to the wheelset axle. At the same time, manufacturing tolerance requirements are low. The device according to the invention is, moreover, also suitable for rail vehicles with a maximum speed of over 160 km/h.

Further exemplary embodiments and advantages of the invention constitute the subject matter of the following description of exemplary embodiments of the invention with reference to the figures of the drawings, in which identical reference numerals refer to identically acting components and in which

DESCRIPTION OF THE INVENTION

Figure 1:
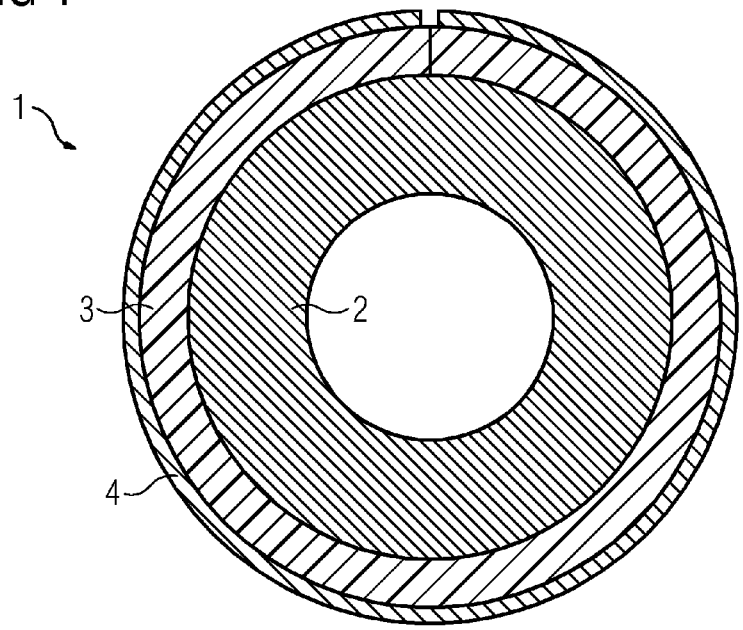
FIG. 1 is a cross-sectional view of a first exemplary embodiment of the device according to the invention when mounted.

FIG. 1 shows an exemplary embodiment of the device 1 according to the invention with said device mounted on a wheelset axle 2. The device 1 comprises an elastomeric mat 3 and a housing 4 made from sheet metal. The sheet metal of the housing consists of stainless steel. Both the housing 4 and the elastomeric mat 3 are of one-piece construction. The thickness of the elastomeric mat 3 and its bending strength are matched to one another such that the elastomeric mat 3 is easy to apply to the wheelset axle 2. The same also applies to the housing 4, it being unnecessary for the two free ends of the sheet metal 4 to abut one another when mounted. A small gap between the two free ends, as shown in FIG. 1, is wholly acceptable.

To retain the elastomeric mat 3 and the housing 4 on the wheelset axle 2, connecting means in the form of hose clips are provided, but not shown in FIG. 1.

Figure 2:
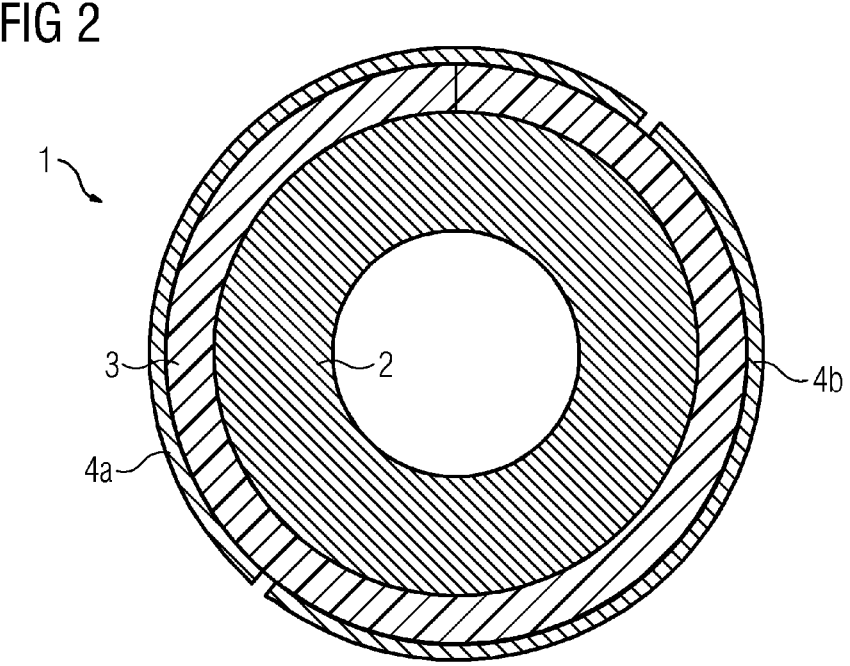
FIG. 2 shows a further exemplary embodiment of the device according to the invention when mounted.

FIG. 2 shows an exemplary embodiment of the device according to the invention 1 which differs from FIG. 1 and in which it is clear that the housing 4 is no longer made in one piece as in FIG. 1. Instead, the housing 4 consists of two separate housing sheets 4a and 4b, which are jointly retained on the wheelset axle 2 by connecting means in the form of hose clips. The elastomeric mat 3, however, is formed in one piece as in FIG. 1. The two-piece configuration of the housing 4 simplifies mounting. The housing parts 4a and 4b may be appropriately pre-shaped, such that a less flexible material may be selected. This increases the shock resistance of the housing.

Figure 3:
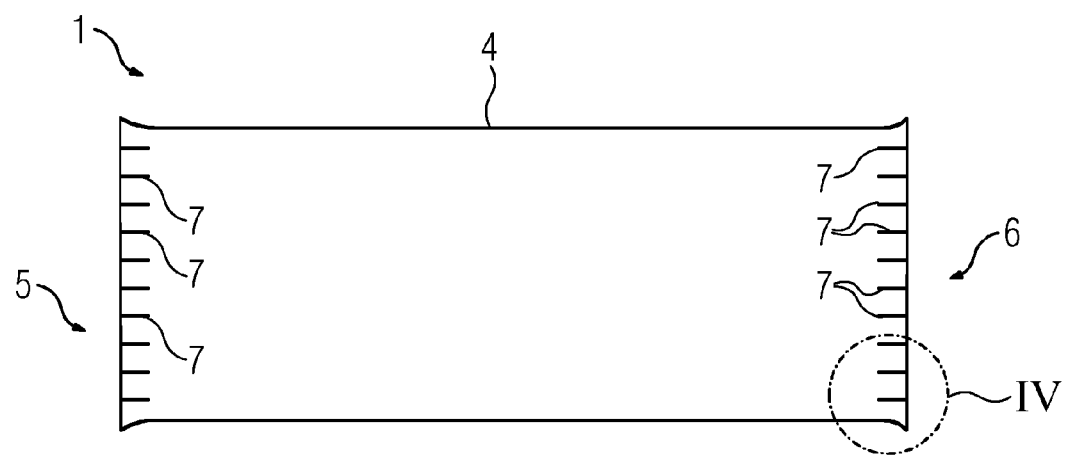
FIG. 3 is a plan view of the device according to the invention according to FIG. 1.

FIG. 3 shows the device 1 according to FIG. 1 in plan view. It is apparent that the housing 4 comprises incisions 7 at its free, mutually facing ends 5 and 6.

Figure 4:
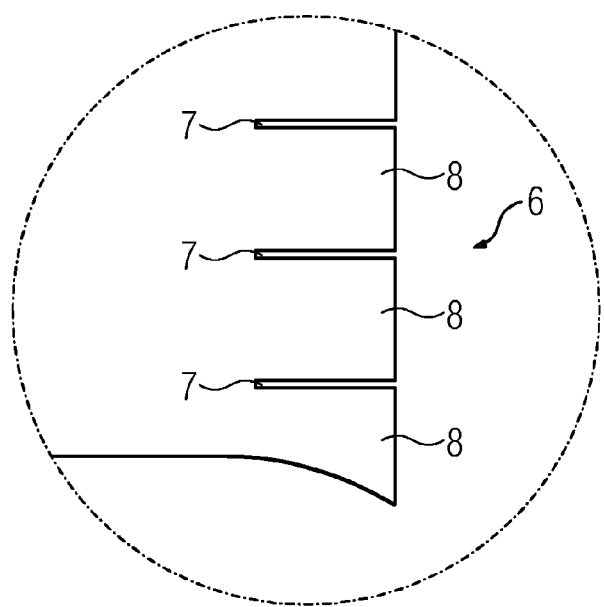
FIG. 4 is an enlarged representation of the end region of the device according to FIG. 3.

FIG. 4 shows the free end 6 of the device 1 according to FIG. 3 in an enlarged representation, in which the incisions 7 are more clearly visible. It is apparent in particular that the incisions 7 define tongues 8, which are easy to bend, such that the housing may be simply adapted to the geometry of the wheelset axle, which is generally thicker in its end region, at which the wheels are mounted. The tongues 8 may simply be bent outwards, such that on mounting of the housing 8 the latter may be simply adapted to the geometry of the wheelset axle.

Figure 5:
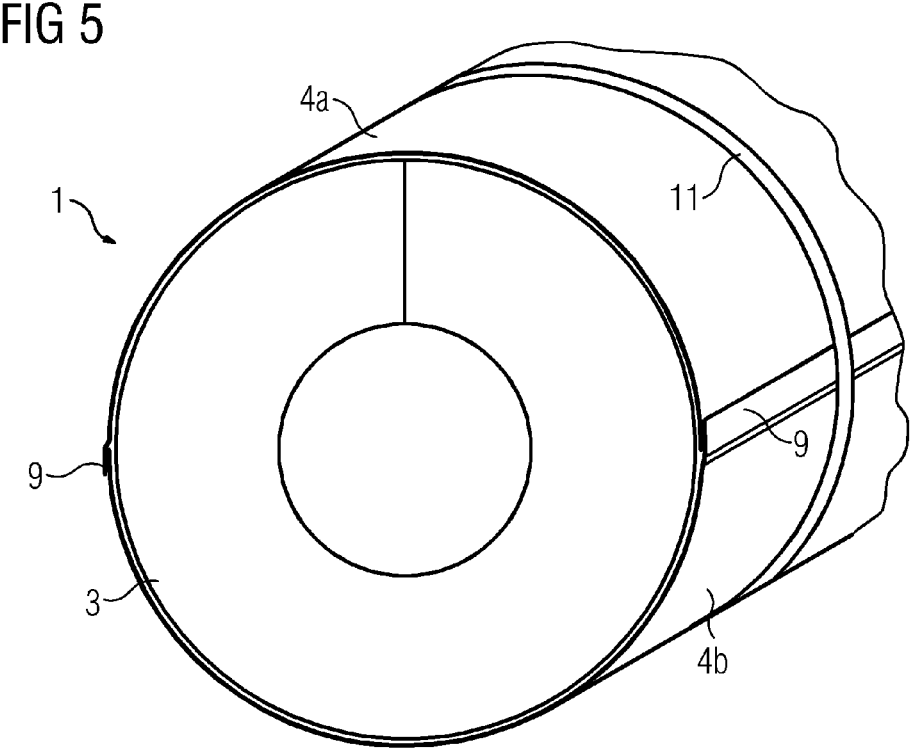
FIG. 5 is a perspective view of a further exemplary embodiment of the device and FIG. 6 is an enlarged representation of an overlap region of the device according to FIG. 5.

FIG. 5 shows a further exemplary embodiment of the device according to the invention 1 in a perspective representation. The wheelset axle 2 is not shown in the figure, for the sake of greater clarity. It is clear that the housing 4 enveloping the elastomeric mat 3 is again composed of two separate housing parts 4a and 4b. At its free peripheral sides each housing part 4a, 4b in each case comprises an overlap deflection 9, such that at these points the outer diameter of the device 1 is expanded. With the overlap deflection 9 the housing part 4a or 4b respectively projects over the undeflected peripheral side of the respective other housing part 4b or 4a. In these regions the housing parts 4a and 4b therefore overlap, such that extensive roof-like housing overlaps are formed. This prevents space between the mutually facing peripheral sides of the housing parts 4a and 4b. In this way, the elastomeric mat 3 and thus the wheelset axle 2 are shielded even better. To clamp the housing 4 and the elastomeric mat 3 to the wheelset axle 2, retaining means 11 are used, which comprise a flexible strap, which has retaining eyelets at its two free ends, which arise for example by turning over the strap appropriately and stitching the turned-over end to the strap. A clamp clip of a clamping fastener, not shown in the figures, extends through this retaining eyelet. By turning a threaded nut or the like, the clamp clips are moved towards one another, such that the strap is drawn together. In the process, the strap surrounds the housing 4 and retains the housing 4 and the elastomeric mat 3 on the wheelset axle 2.

Figure 6:
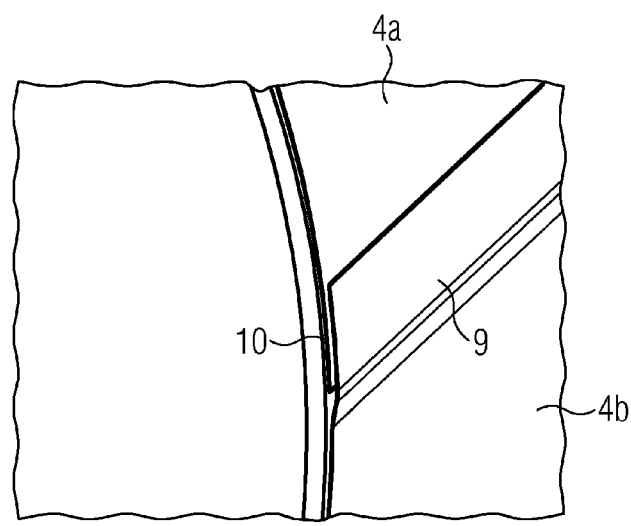

The overlap deflection 9 of the housing part 4b is shown in more detail in FIG. 6, which shows that the overlap deflection 9 of the housing part 4b is S-shaped, the non-deflected free peripheral side 10 of the housing part 4a extending under the overlap deflection 9.

The invention claimed is:

1. A device for protecting a wheelset axle of a rail vehicle, the device comprising:
   an elastomeric mat to be placed on the wheelset axle and retaining means configured to retain said elastomeric mat on the wheelset axle;
   a housing of a rigid material disposed for at least partially enclosing said elastomeric mat, said housing having two mutually facing free ends each facing a wheel when said housing is mounted, and said free ends having incisions formed therein, said incisions defining tongues having tongue free ends, said tongue free ends being said two mutually facing free ends of said housing.

2. The device according to claim 1, wherein one or both of said elastomeric mat or said housing are configured, after mounting, for extensively and completely enclosing the wheelset axle.

3. The device according to claim 1, wherein one or both of said housing or said elastomeric mat consist of a plurality of separate parts.

4. The device according to claim 1, wherein said housing is made of sheet metal.

5. The device according to claim 1, wherein said retaining means are selected from the group consisting of hose clips and clamping fasteners.

6. The device according to claim 1, wherein said housing is formed with at least one overlap deflection for forming an extensive housing overlap.

7. A rail vehicle, comprising at least one wheelset axle provided with a device according to claim 1.

8. A bogie, comprising at least one wheelset axle provided with a device according to claim 1.

9. The device according to claim 1, wherein said tongues of the housing for allowing the housing to be bent to match a geometry of the wheelset axle.

* * * * *